United States Patent
DiFonzo et al.

(10) Patent No.: US 7,790,637 B2
(45) Date of Patent: Sep. 7, 2010

(54) COMPOSITE LAMINATE HAVING AN IMPROVED COSMETIC SURFACE AND METHOD OF MAKING SAME

(75) Inventors: John DiFonzo, Emerald Hill, CA (US); Chris Ligtenberg, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 11/932,244

(22) Filed: Oct. 31, 2007

(65) Prior Publication Data

US 2009/0110872 A1    Apr. 30, 2009

(51) Int. Cl.
*B32B 27/04* (2006.01)
*D04H 1/00* (2006.01)

(52) U.S. Cl. ............... 442/50; 442/54; 442/58; 442/179; 442/180

(58) Field of Classification Search ............ 442/50, 442/54, 58, 179, 180
See application file for complete search history.

(56) References Cited

U.S. PATENT DOCUMENTS

| | | | |
|---|---|---|---|
| 5,201,979 A | 4/1993 | Koba et al. | |
| 5,482,774 A | 1/1996 | Miyamoto et al. | |
| 5,607,769 A | 3/1997 | Choate | |
| 6,238,761 B1 | 5/2001 | Jeong et al. | |
| 6,440,593 B2 | 8/2002 | Ellison et al. | |
| 6,503,856 B1 | 1/2003 | Broadway et al. | |
| 2005/0255766 A1* | 11/2005 | Kruger et al. | 442/21 |
| 2007/0222122 A1 | 9/2007 | Ong et al. | |
| 2007/0281562 A1* | 12/2007 | Kohlman et al. | 442/32 |
| 2009/0095523 A1 | 4/2009 | Stevenson et al. | |

FOREIGN PATENT DOCUMENTS

| | | |
|---|---|---|
| JP | 60163936 | 8/1985 |
| JP | 3293105 | 12/1991 |

* cited by examiner

*Primary Examiner*—Ula C Ruddock
(74) *Attorney, Agent, or Firm*—Sterne, Kessler, Goldstein & Fox PLLC

(57) ABSTRACT

A composite laminate includes a plurality of sheets of prepreg stacked one over another, and a scrim layer provided on an exterior surface of the sheets of prepreg. Each prepreg sheet is formed of fibers preimpregnated with resin. The scrim layer and the sheets of prepreg form a composite laminate whereby the scrim layer constitutes an outer, exposed surface of the composite laminate. The scrim layer may be a nonwoven carbon or glass fiber scrim that has absorbed resin from the sheets of prepreg. A method of making a composite laminate includes placing into a mold a scrim and a plurality of sheets of prepreg, with the scrim extending between an exterior surface of the sheets of prepreg and an inner surface of the mold; forming a composite laminate whereby the scrim is adhered to the sheets of prepreg; and removing the composite laminate from the mold. An outer layer of the composite laminate includes the scrim.

21 Claims, 4 Drawing Sheets

COMPOSITE LAMINATE HAVING AN IMPROVED COSMETIC SURFACE AND METHOD OF MAKING SAME

BACKGROUND OF THE INVENTION

1. Field of the Invention

The present invention relates to composite laminates, and more particularly, the present invention relates to composite laminates prepared from fiber reinforced resin impregnated materials.

2. Background Art

Many products are formed of plastics because they are light weight and can be readily shaped and styled. Electrical equipment enclosures, such as enclosures for computers and portable electronic devices, for example, are typically formed of plastic materials to make aesthetic, functional housings. Plastic housings for electronic equipment can be both rigid and lightweight, and can be durable without being bulky. Electronic equipment enclosures also typically provide shielding against electromagnetic pollution, such as that which emanates from the electronic device or exists in the surrounding environment.

Plastic housings for electronic equipment may be prepared from plastic material reinforced with carbon fiber. Carbon fiber reinforced plastic, also referred to as carbon fiber composites, provide a very strong, lightweight material for forming housings for electronic equipment. Carbon fiber composites may be formed by layering sheets of carbon fiber material into a mold that is the shape of the desired product. The mold may then be filled with a thermosetting resin (e.g., an epoxy resin prior to being cured) and the resin cured to thermoset the resin (e.g., autoclave cured and/or vacuum bagged). The mold may also be filled with a thermoplastic resin that is then "cured" in the sense that after the resin conforms to the shape of the mold, it is cooled until the thermoplastic resin is below its glass transition temperature and therefore maintains its shape. Another method of producing carbon fiber composites is by layering sheets of carbon fiber material that has been preimpregnated with thermoplastic resin or partially cured thermosetting resin (or has a layer of thermoplastic resin or partially cured thermosetting resin layered over each sheet) into a mold that is in the shape of the desired product. This assembly may then be placed in a vacuum or is subject to thermal compression until the resin fully cures.

Despite the many benefits of carbon fiber composites, such composites are typically black and the carbon fibers are typically visible on the composite surface. In addition, the fibers (either as a unidirectional, woven, or nonwoven substrate) are typically variable in their construction and therefore are variable in their surface presentation. As a result, the resulting carbon fiber composite can have cosmetic imperfections that reduce the aesthetic appearance of the molded article formed therefrom. Further, carbon fiber composites, often being black, provide a narrow range of surface appearance to the molded article and therefore may give a "tired", unexciting look.

BRIEF SUMMARY OF THE INVENTION

A composite laminate having an improved cosmetic surface is presented herein. The composite laminate includes a plurality of sheets of preimpregnated material, or prepreg, stacked one over another and a scrim layer provided on an exterior surface of the sheets of prepreg. The scrim layer and the sheets of prepreg form a composite laminate whereby the scrim layer constitutes an outer, exposed surface of the composite laminate. Each sheet of prepreg is made from fibers preimpregnated with resin, and the fibers of the prepreg may be substantially parallel or woven carbon fibers. The scrim layer may be a glass fiber or carbon fiber scrim, or veil, that has absorbed resin from the sheets of prepreg during a molding process. In another embodiment, the composite laminate includes a plurality of sheets of prepreg stacked one over another and first and second scrim layers provided on opposing exterior surfaces of the sheets of prepreg, whereby the sheets of prepreg are sandwiched between the first and second scrim layers. The first and second scrim layers constitute exposed surfaces of the composite laminate.

A method of making a composite laminate having an improved cosmetic surface includes the steps of placing into a mold a scrim and a plurality of sheets of prepreg, with the scrim extending between the sheets of prepreg and an inner surface of the mold; forming a composite laminate whereby the scrim is adhered to the sheets of prepreg; and removing the composite laminate from the mold. An outer layer of the composite laminate includes the scrim. In one embodiment, the forming step includes causing the scrim to absorb the resin from the sheets of prepreg, whereby the resin and the scrim form the outer layer of the composite laminate.

Further embodiments, features, and advantages of the present inventions, as well as the structure and operation of the various embodiments of the present invention, are described in detail below, with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention. In the drawings, like reference numbers, letters, or renderings indicate identical or functionally similar elements.

DETAILED DESCRIPTION OF THE INVENTION

Figure 1A:
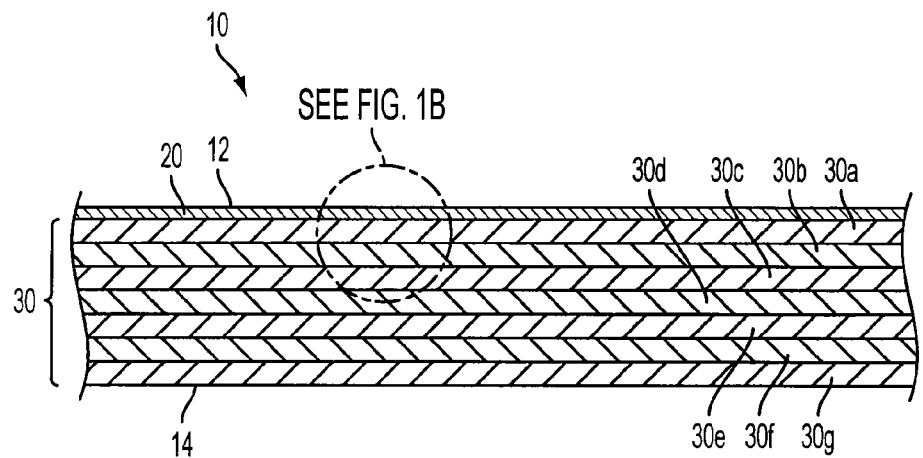
FIG. 1A is a cross-sectional schematic view of a composite laminate for forming a molded article, in accordance with one embodiment of the present invention.
Figure 1B:
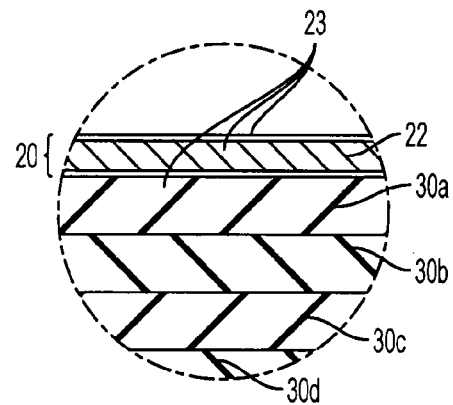
FIG. 1B is an enlarged view of a portion of the composite laminate of FIG. 1A.

A molded article in accordance with one embodiment of the present invention may be formed of a composite laminate 10, illustrated in FIGS. 1A and 1B. Composite laminate 10 has opposing first and second surfaces 12 and 14, respectively, and is formed of a composite 30 and a scrim layer 20. Surface 12 is formed on the exterior of scrim layer 20. Surface 14 is formed on the exterior of composite 30. Composite 30 is formed of a plurality of sheets of prepreg 30a-30g that are fused together during a molding process. An exemplary molding process for making composite laminate 10 is provided below with reference to FIGS. 2 and 3. In the embodiment illustrated in FIG. 1A, eight sheets of prepreg (30a-30g) form composite 30. However, it should be understood that any number of sheets of prepreg may be used. For example, in one embodiment, between 5 and 8 sheets may be used, and in another embodiment, 20 sheets may be used. Further, the sheets of prepreg can vary in thickness. For example, a sheet of prepreg can have a thickness in a range of about 25-200 μm. Therefore, a designer may choose to use more or less sheets of prepreg depending on the thicknesses of the sheets and the strength the composite laminate that is desired.

As used herein, the term "prepreg" refers to fibers preimpregnated with resin, such as a combination of a fibrous substrate (such as a mat, fiber, or cloth material) with resin impregnated on and into the substrate. Each sheet of prepreg 30a, b, . . . g is a substantially planar sheet of fibers impregnated with a resin that is initially ready for curing. During the molding process for forming composite laminate 10, the resin of prepreg sheets 30a-30g are cured. There are many types of resins that may be used in prepreg sheets 30a-30g, including, but not limited to, conventional thermoplastic resins and conventional thermosetting resins such as epoxies. The resin is typically at an intermediate stage prior to becoming fully cured. The fibers of the prepreg sheets 30a-30g sheets may be, for example, carbon fibers. To produce a sheet of prepreg, continuous fibers formed from bundles of filaments may be linearly oriented to produce a sheet of unidirectional fibers, or the fibers may be woven to produce a woven sheet, as known to one of skill in the relevant art(s). These fibrous sheets are then impregnated with resin to form sheets of prepreg. Sheets of prepreg 30a-30g can be formed using conventional methods for impregnating fibers with resin. For example, one method of manufacturing a sheet of prepreg is disclosed in U.S. Pat. No. 5,201,979, which is incorporated herein in its entirety by reference thereto.

As shown in FIG. 1B, scrim layer 20 is formed of a scrim 22 and resin 23. During the molding process, excess resin 23 from the plurality of sheets of prepreg 30a-30g seeps through and is absorbed by scrim 22, such that surface 12 of composite laminate 10 includes resin 23 and scrim 22. Scrim 22 is thin (e.g., about 50 μm thickness), and may be made of a nonwoven mat of fibers, randomly oriented, similar to felt. The fibers of scrim 22 may be carbon fibers, glass fibers, and synthetic resin fibers (e.g., aramid fiber). The fibers may also be inorganic fibers such as metal fibers (e.g., aluminum fibers or titanium fibers). In one embodiment, scrim 22 may be a nonwoven glass fiber scrim, and in another embodiment scrim 22 may be a nonwoven carbon fiber scrim, such as Part #1064 produced by Fibre Glast Developments Corp. of Brookville, Ohio. Also, in one embodiment, scrim 22 may be impregnated with resin.

Since glass fiber is less stiff than carbon fiber, composite laminate 10 having a glass fiber scrim has improved impact resistance over a like composite laminate incorporating a carbon fiber scrim. Scrim 22 extends over composite 30 and hides the reinforcing fibers of prepreg sheets 30a-30g. Since scrim 22 absorbs resin 23 of the composite 30, scrim 22 takes on the cosmetic properties and color of resin 23. Also, as noted above, scrim 22 is very thin, and it is translucent, and the underlying fibers of composite 30 are partially visible therethrough. The combination of resin 23 and scrim 22 forming scrim layer 20 imparts a depth to surface 12 of composite laminate 10, thereby providing an improved cosmetic surface of a molded article formed therefrom that is not only consistent in appearance, but is also aesthetically pleasing.

Resin 23 may be clear or pigmented. Clear resin would provide the most visibility of scrim 22 and the underlying fibers of composite 30, and therefore provides a greater perception of depth to surface 12 than pigmented resin. For example, pigmented resin would produce a translucent, colored surface, altering the apparent depth of surface 12 of composite laminate 10 and providing further variation to the cosmetic surface of the molded article. Moreover, if a clear glass fiber scrim is used as part of scrim layer 20, scrim 22 would be transparent, such that pigmented resin has a greater impact on the color and apparent depth of surface 12 of composite laminate 10. To provide further variation to the appearance of surface 12, the thickness of the scrim may be varied. In one embodiment, the scrim may be just thick enough to be substantially opaque, whereby the underlying fibers of prepreg sheets 30a-30g are not visible therethrough.

Composite laminate 10 may be provided with a smooth and/or textured surface. A textured surface may be achieved by applying a texture to the inner surface of a mold, which is then transferred to resin 23 during the molding process. As such, the several embodiments of the present invention described herein provide a designer with the opportunity to produce molded articles that have the advantageous properties of carbon fiber composites, without being limited to its black color or its imperfections in appearance. Composite laminate 10 may form any shape of molded article. In one embodiment, the molded article is an enclosure, such as a housing for an electronic device, with first surface 12 being the outer, exposed surface of the molded article, and second surface 14 constituting an inner, hidden surface thereof. In this instance, scrim layer 20 imparts the enclosure with a consistent and pleasing cosmetic surface. Further, in molded articles having irregular curved portions, such as curved corners of an enclosure, the underlying fibers of the prepreg sheets are most likely to be inconsistently oriented and are therefore less likely to provide the molded article with a uniform appearance. Therefore, the presence of scrim layer 20 provides congruency between the appearance of the irregular curved portions of the enclosure.

Figure 2:
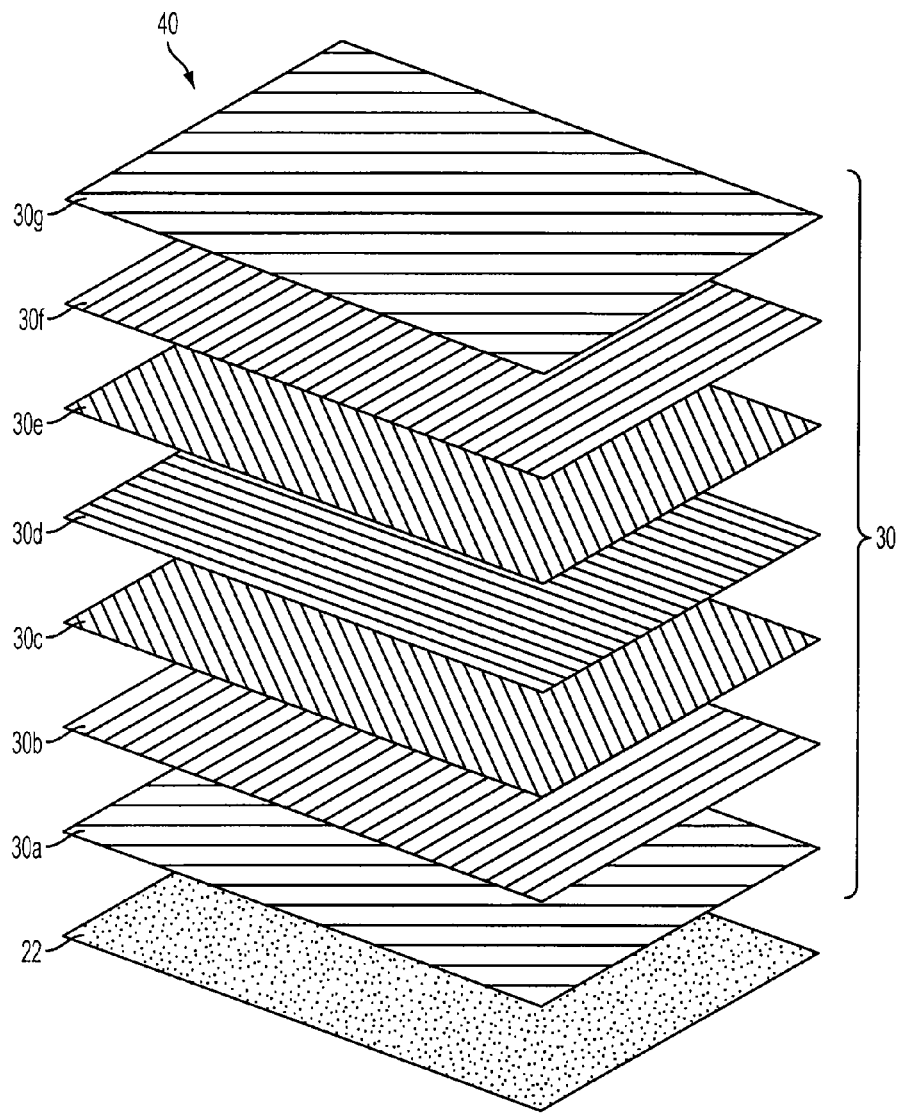
FIG. 2 is a exploded, schematic view of stacked sheets of resin impregnated material and a scrim used to form the composite laminate of FIG. 1A.

A method of making composite laminate 10 will now be described with reference to FIGS. 2 and 3. FIG. 2 shows an exploded, schematic view of a plurality of sheets of prepreg 30a-30g and a scrim 22, prior to being laminated together to form composite laminate 10 shown in FIG. 1A. In the schematic of FIG. 2, each sheet of prepreg 30a,b . . . g, may be formed of woven, nonwoven or parallel (i.e., unidirectional) fibers. In one embodiment, the fibers of at least one sheet of prepreg may be substantially woven. In another embodiment, the fibers of at least one sheet of prepreg of composite 30 may be substantially parallel carbon fibers. In another embodiment, all sheets of prepreg that form composite 30 may be formed of substantially parallel carbon fibers. Further, in one embodiment, fibers of adjacent sheets 30a,b . . . g may be disposed at an angle to one another, such as illustrated in FIG. 2. Typically, the orientation of the fibers of the adjacent sheets of prepreg are varied to improve the strength of the molded article formed therefrom.

Extending over a face of composite 30 is a scrim 22. In the embodiment of FIG. 2, scrim 22 extends beneath prepreg sheet 30a, and scrim 22 and sheets 30a-30g form an assembly 40 that may then be placed in a mold all at once. FIG. 3 shows assembly 40 placed in a mold 50 such that scrim 22 extends between an inner surface of mold 50 and the bottom-most prepreg sheet (i.e., sheet 30a) of composite 30, with prepreg sheets 30a-30g stacked over scrim 22. Alternatively, assembly 40 may be formed directly in mold 50 by placing scrim 22 in mold 50 and thereafter placing individual prepreg sheets 30a,b . . . g in mold 50.

Scrim 22 is then adhered to composite 30 during a molding process conventional in the relevant art, for example, by applying heat and/or pressure so as to laminate together scrim 22 and prepreg sheets 30a-30g and cure resin 23. When assembly 40 is laminated together to form composite laminate 10, scrim 22 absorbs excess resin 23 of prepreg sheets 30a-30g, thereby forming scrim layer 20 which is unitary with composite 30, as illustrated in FIGS. 1A and 1B. Thereafter, the laminated prepreg sheets 30a-30g and scrim layer 20 are removed from mold 50, with scrim layer 20 forming surface 12 of composite laminate 10.

Figure 4:
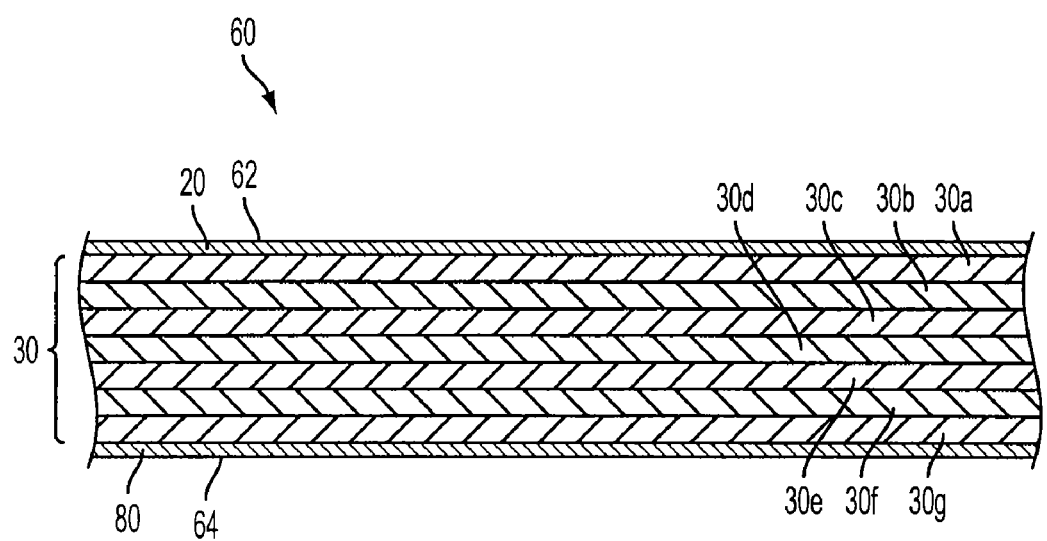
FIG. 4 is a cross-sectional schematic view of another composite laminate for forming a molded article, in accordance with another embodiment of the present invention.

In another embodiment, depicted in FIG. 4, a composite laminate 60 may be formed in which the plurality of prepreg sheets 30a-30g of composite 30 are sandwiched between scrim layer 20 and a second scrim layer 80, which constitute an outer surface 62 and an inner surface 64, respectively, of composite laminate 60. As such, both inner and outer surfaces of a molded article formed from composite laminate 60 are provided with a consistent, aesthetically pleasing appearance, which may be especially desired when both the inner and outer surfaces of the molded article are visible to a user.

Figure 3:
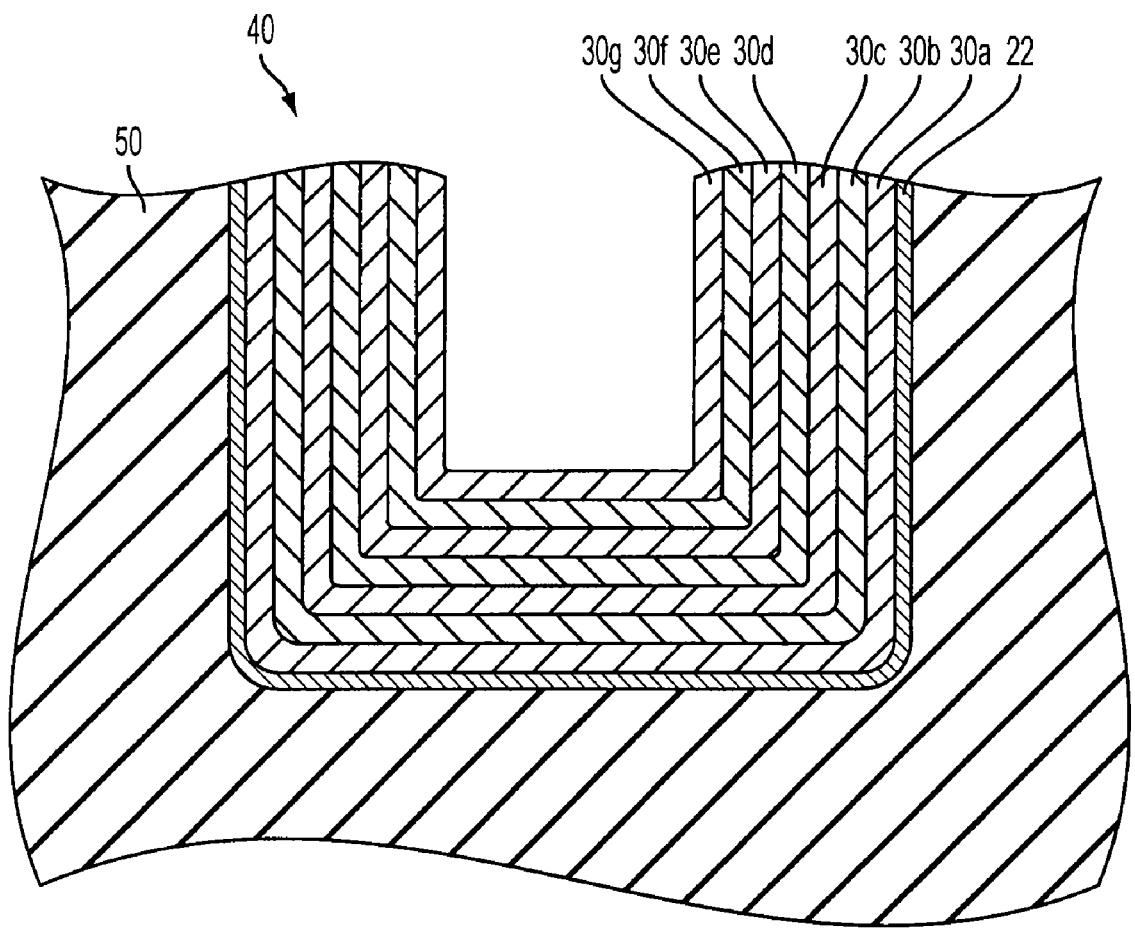
FIG. 3 is a cross-sectional schematic view of the material of FIG. 2 placed in a mold for preparation of a molded article formed of the composite laminate of FIG. 1A, in accordance with one embodiment of the present invention.

Composite laminate 60 may be formed similar to composite laminate 10, but with assembly 40 of FIG. 3 including another scrim extending over the upper-most prepreg sheet (i.e., sheet 30g) of composite 30. During a compression molding process, excess resin from prepreg sheets 30a-30g would also seep through the scrim over prepreg sheet 30g, adhering the scrim to composite 30. The resin and scrim forms scrim layer 80. The scrims of scrim layers 20 and 80 may be formed of like materials (e.g., both scrims are carbon fiber scrims), or the scrims may be formed of different materials (e.g., scrim 22 may be a glass fiber scrim while the scrim of scrim layer 80 is a carbon fiber scrim). It should therefore be apparent that various modifications to scrim layers 20 and/or 80 of composite laminate 60 may be employed so as to achieve molded articles having a variety of cosmetic surfaces in accordance with the present invention.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A composite laminate comprising:
   a plurality of sheets of prepreg, the sheets being stacked one over another, each sheet of prepreg including fibers preimpregnated with resin; and
   a scrim layer provided on an exterior surface of the plurality of sheets of prepreg, wherein the scrim layer and the sheets of prepreg form a composite laminate and the scrim layer constitutes an outer, exposed surface of the composite laminate, wherein the scrim layer is made of a nonwoven mat of randomly oriented fibers and provides the outer surface of the composite laminate with a consistent appearance.

2. The composite laminate of claim 1, wherein the fibers of each sheet of prepreg is made of carbon fibers.

3. The composite laminate of claim 1, wherein the fibers of at least one sheet of prepreg is made of substantially woven carbon fibers.

4. The composite laminate of claim 1, wherein the fibers of at least one sheet of prepreg is made of substantially parallel carbon fibers.

5. The composite laminate of claim 1, wherein the fibers of each sheet of prepreg is made of substantially parallel carbon fibers.

6. The composite laminate of claim 5, wherein carbon fibers in adjacent sheets of prepreg are disposed at an angle relative to one another.

7. The composite laminate of claim 1, wherein the scrim layer is made of nonwoven carbon fibers that have absorbed resin from the sheets of prepreg.

8. The composite laminate of claim 1, wherein the scrim layer is made of nonwoven glass fibers that have absorbed resin from the sheets of prepreg.

9. The composite laminate of claim 1, wherein the resin in each sheet of prepreg is pigmented.

10. The composite laminate of claim 1, wherein the scrim layer is substantially opaque, wherein the fibers of the sheets of prepreg are hidden from view by the scrim layer.

11. An electronic equipment enclosure formed from the composite laminate of claim 1, wherein the scrim layer constitutes an outer, exposed surface of the electronic equipment enclosure.

12. The composite laminate of claim 1, wherein the randomly oriented fibers of the scrim layer have fully absorbed resin from the sheets of prepreg.

13. The composite laminate of claim 1, wherein the scrim layer constitutes substantially the entire outer surface of the composite laminate and provides substantially the entire outer surface of the composite laminate with a consistent appearance.

14. A composite laminate comprising,
   a plurality of sheets of prepreg, the sheets being stacked one over another, each sheet of prepreg including fibers preimpregnated with resin; and
   a scrim layer provided on an exterior surface of the plurality of sheets of prepreg, wherein the scrim layer and the sheets of prepreg form a composite laminate and the scrim layer constitutes an outer, exposed surface of the composite laminate, wherein the scrim layer is made of a nonwoven mat of randomly oriented fibers and provides the outer surface of the composite laminate with a consistent appearance, wherein the scrim layer is made of nonwoven carbon fibers that have absorbed resin from the sheets of prepreg, wherein the outer, exposed surface of the composite laminate is textured.

15. A composite laminate comprising:
   a plurality of sheets of prepreg, the sheets being stacked one over another, each sheet of prepreg including fibers preimpregnated with resin;
   a first scrim layer provided on a first exterior surface of the plurality of sheets of prepreg; and
   a second scrim layer provided on a second exterior surface of the plurality of sheets of prepreg opposite of the first exterior surface, wherein the first and second scrim layers and the sheets of prepreg form a composite laminate, whereby the sheets of prepreg are sandwiched between the first and second scrim layers and the first and second scrim layers constitute exposed surfaces of the composite laminate, wherein the first and second scrim layers are each made of a nonwoven mat of randomly oriented fibers and provide the exposed surfaces of the composite laminate with a consistent appearance.

16. The composite laminate of claim 15, wherein the fibers of each sheet of prepreg is made of carbon fibers.

17. The composite laminate of claim 15, wherein the first and second scrim layers are made of nonwoven carbon fibers that have absorbed resin from the sheets of prepreg.

18. The composite laminate of claim 17, wherein the exposed surfaces of the composite laminate are textured.

19. The composite laminate of claim 15, wherein the resin in each sheet of prepreg is pigmented.

20. The composite laminate of claim 15, wherein the randomly oriented fibers of the first and second scrim layers have fully absorbed resin from the sheets of prepreg.

21. The composite laminate of claim 15, wherein the first and second scrim layers constitute substantially the entire exposed surfaces of the composite laminate and provide substantially the entire exposed surfaces of the composite laminate with a consistent appearance.

* * * * *